Oct. 23, 1956  R. M. BOTLEY  2,767,863
MACHINE FOR STACKING AND UNSTACKING OBJECTS
Filed July 17, 1953  7 Sheets-Sheet 1
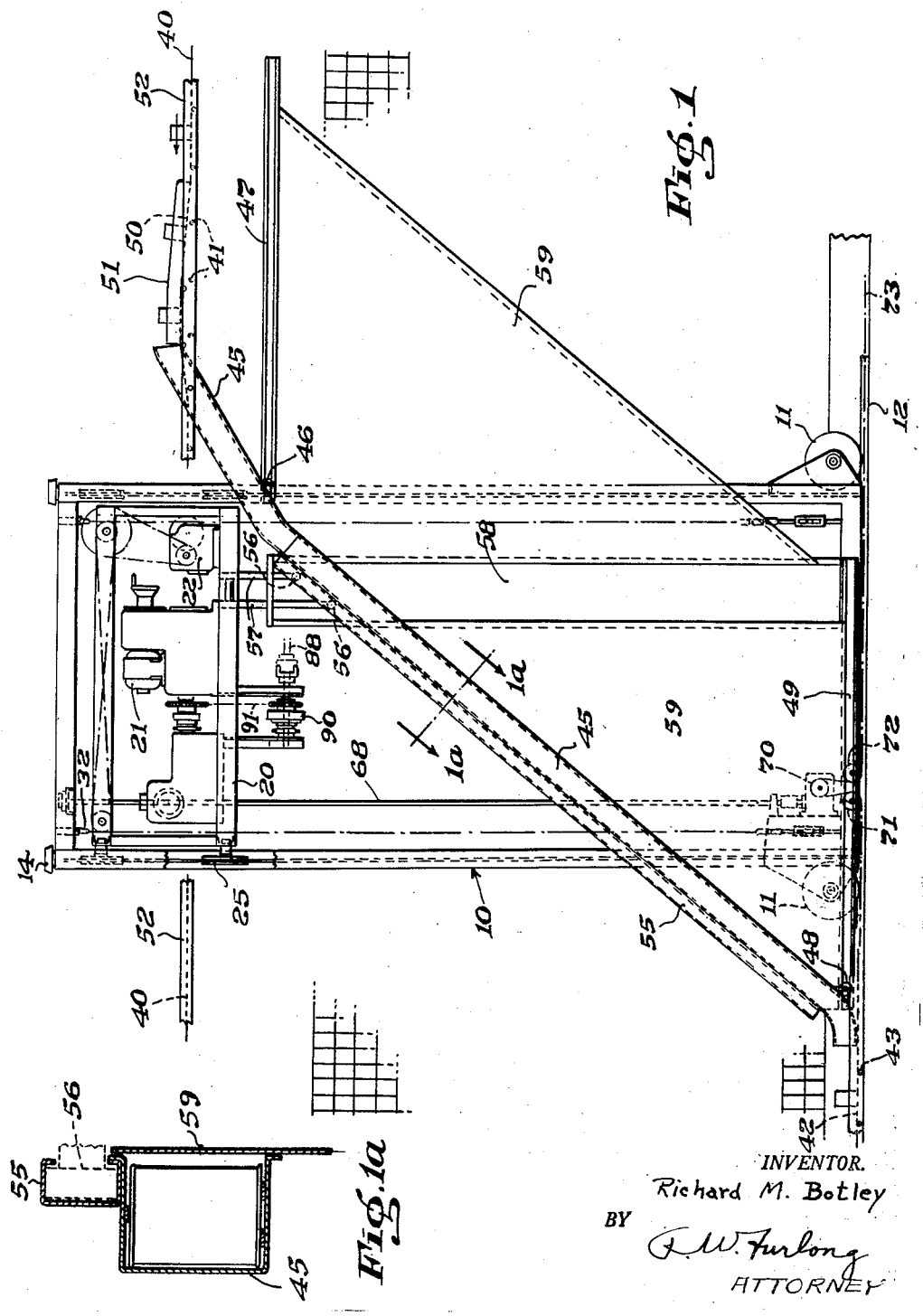
INVENTOR.
Richard M. Botley
BY
F. W. Furlong
ATTORNEY

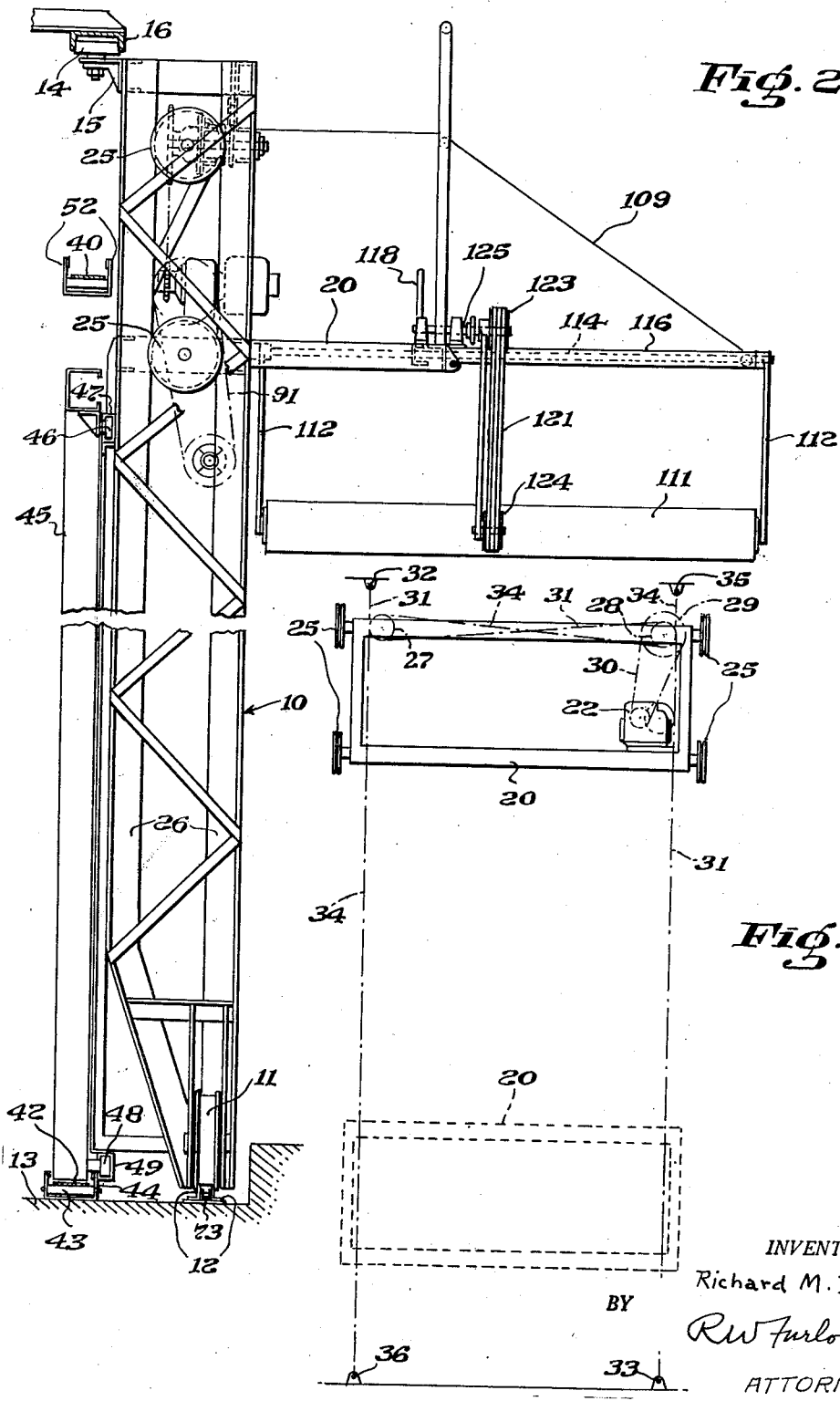

Oct. 23, 1956  R. M. BOTLEY  2,767,863
MACHINE FOR STACKING AND UNSTACKING OBJECTS
Filed July 17, 1953  7 Sheets-Sheet 3

INVENTOR.
Richard M. Botley
BY R. W. Furlong
ATTORNEY

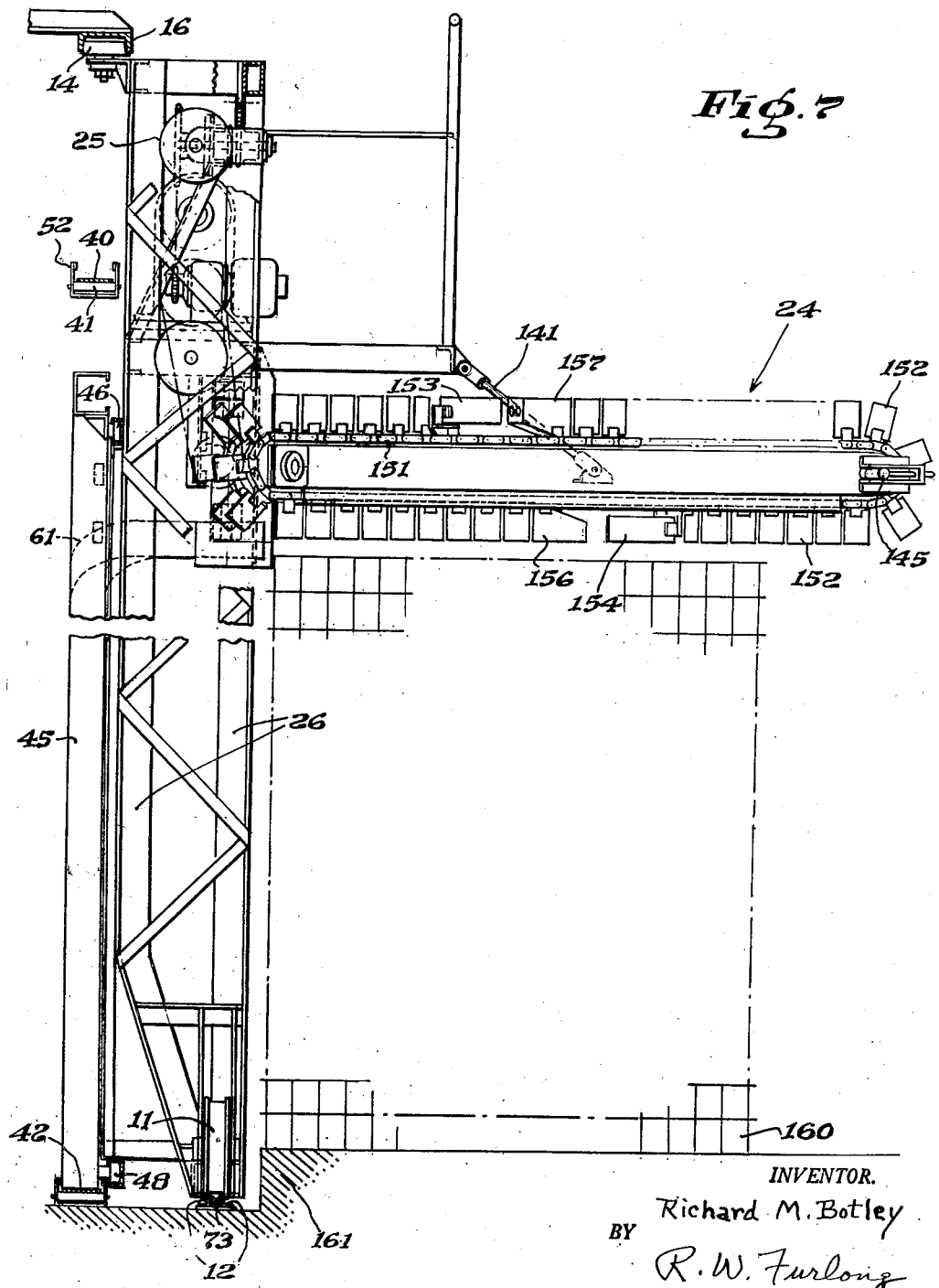

Oct. 23, 1956   R. M. BOTLEY   2,767,863
MACHINE FOR STACKING AND UNSTACKING OBJECTS
Filed July 17, 1953   7 Sheets-Sheet 7
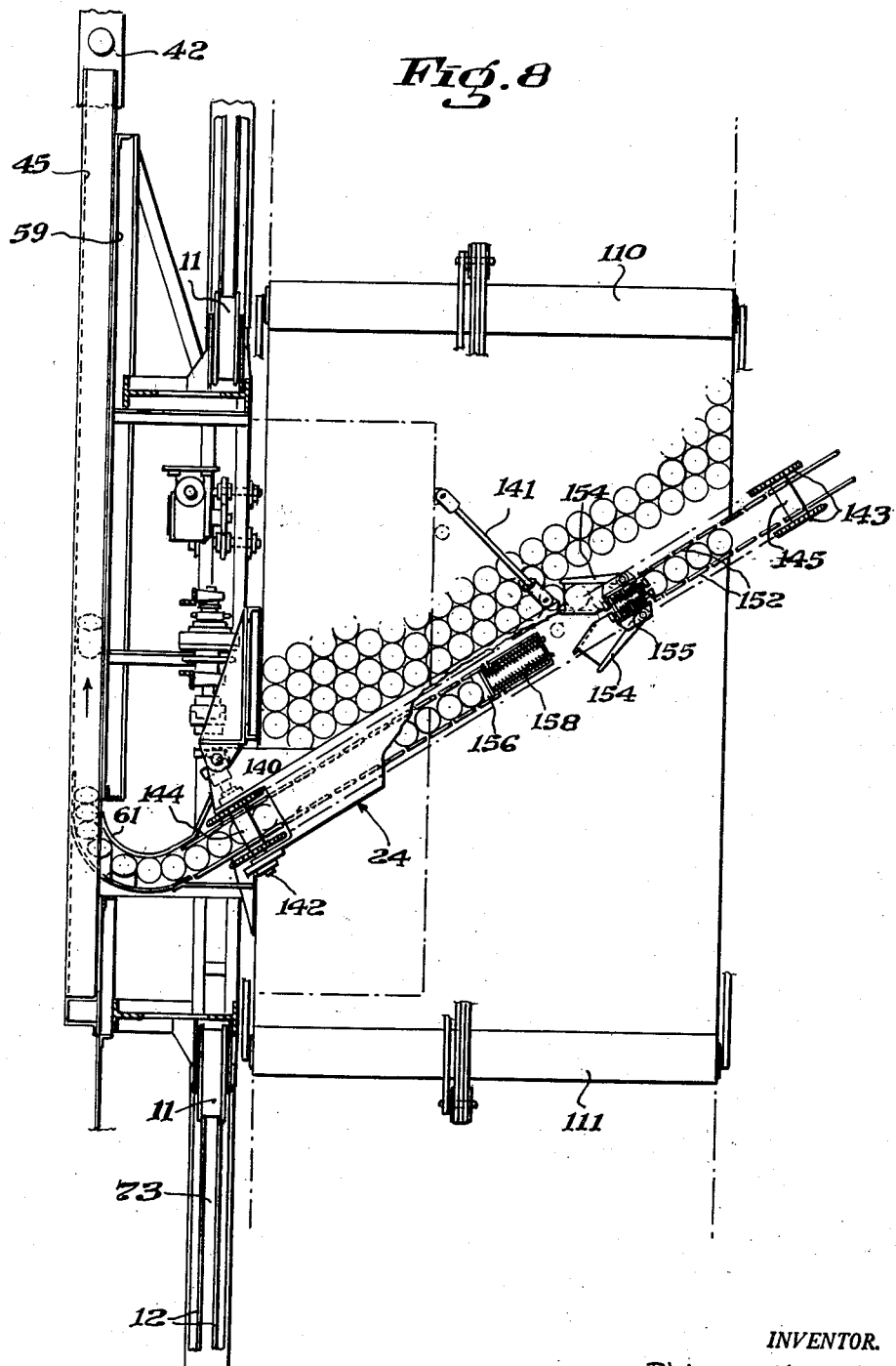
INVENTOR.
Richard M. Botley
BY
R. W. Furlong
ATTORNEY United States Patent Office 2,767,863
Patented Oct. 23, 1956

2,767,863

MACHINE FOR STACKING AND UNSTACKING OBJECTS

Richard M. Botley, Honolulu, Territory of Hawaii, assignor to Hawaiian Pineapple Company, Limited, Honolulu, Territory of Hawaii, a corporation of Hawaii Application July 17, 1953, Serial No. 368,699

20 Claims. (Cl. 214—6)

This invention relates to a machine for stacking and unstacking objects in superposed tiers or layers and pertains more specifically to a machine for stacking and unstacking sealed cans in a warehouse or other storage space.

One object is to provide a stacking and unstacking machine having an endless conveyor extending across the stack, the endless conveyor including a shunt movable with the conveyor for transferring objects to and from the conveyor transversely thereof while the conveyor is moving.

A further object is to provide a machine capable of delivering or receiving a substantially continuous stream of objects to or from a stack without substantial interruption at the end of each row in a tier and with positive control over the arrangement and disposition of objects in each row.

Another object of the present invention is to provide a machine having interchangeable stacking and unstacking assemblies.

Other and further objects will be apparent from the drawings and description of one embodiment of my invention which follows.

The machine of the present invention is useful for the same purposes as that described in my co-pending application Serial No. 169,930, filed June 23, 1950, now Patent No. 2,659,495.

In the drawings Fig. 1 is a side elevation of the machine;

Fig. 1a is a detailed cross sectional view of a portion of the device taken along line 1a, 1a of Fig. 1;

Fig. 2 is an end elevation of the device with the stacking and unstacking assemblies removed;

Fig. 3 is a schematic view showing the elevating mechanism for the auxiliary frame of the machine;

Fig. 7 is an end elevation partly broken away showing the unstacker assembly; and Fig. 8 is a plan view partly broken away showing the unstacker assembly.

Figure 4:
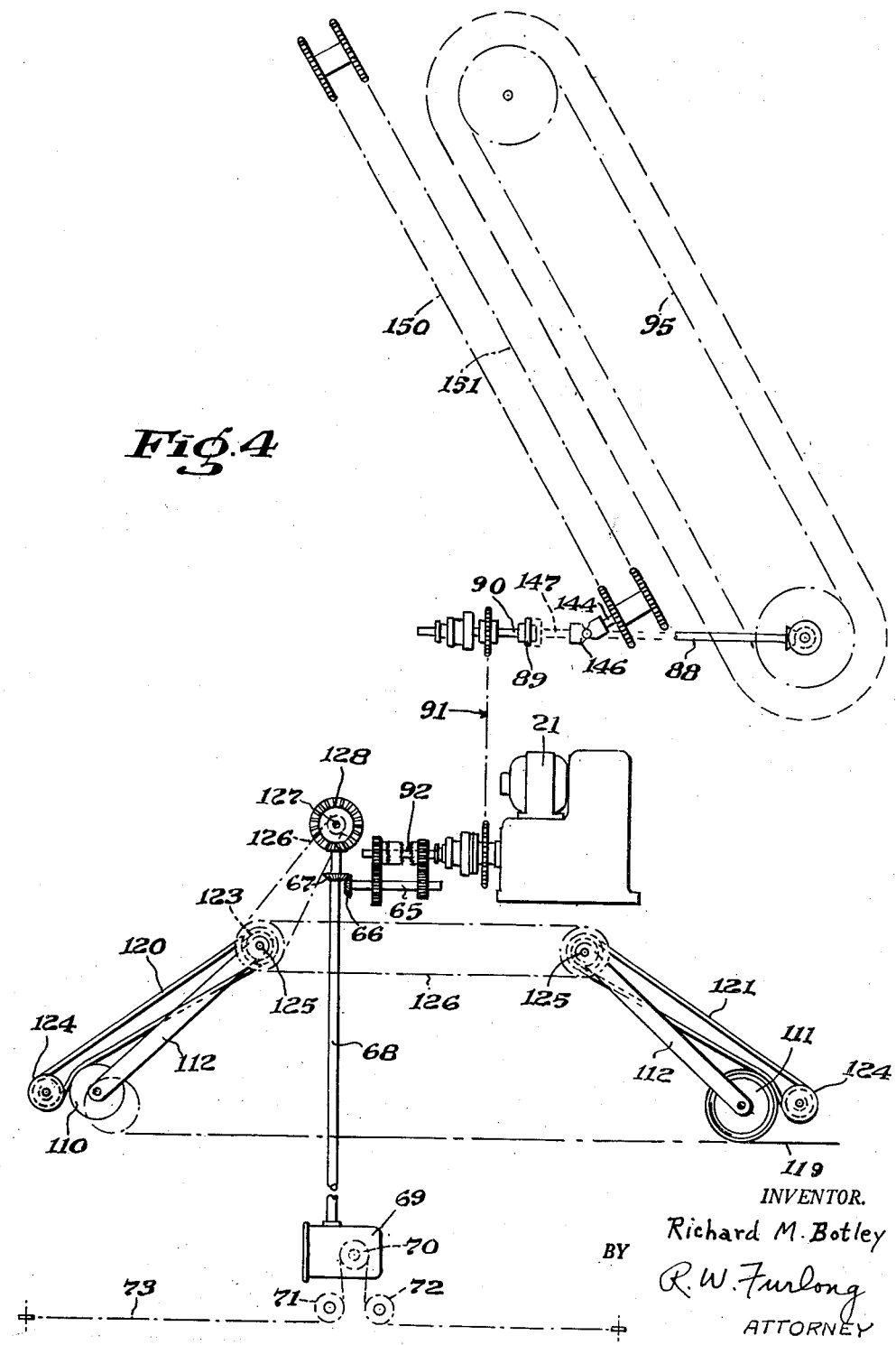
Fig. 4 is a schematic view showing the drive mechanism.

As shown in the drawings, the device includes a main frame 10 generally rectangular in configuration mounted on a pair of wheels 11, 11 riding upon a monorail 12 secured to the floor or other support 13. At the upper end of the main frame a pair of rollers 14, 14 are journaled on a bracket 15 projecting laterally from main frame 10. Rollers 14 ride in a channel track 16 which serves to maintain the main frame in vertical position while moving along rail 12.

Auxiliary frame 20 likewise of generally rectangular configuration is mounted for vertical sliding movement within main frame 10 and serves to carry electric motor 21 which provides the main power source for operating the device and also auxiliary motor 22 which provides power for raising and lowering auxiliary frame 20.

Auxiliary frame 20 also carries stacker assembly 23 (Figs. 5 and 6) and unstacker assembly 24 (Figs. 7 and 8).

As shown best in Figs. 1, 2, and 3, auxiliary frame 20 is provided with rollers 25, 25 riding between spaced parallel girders 26, 26 of main frame 10. Double sprockets 27, 28 are journaled on auxiliary frame 20, a second sprocket 29 being keyed to the same shaft as sprocket 28 and being driven by chain 30 from motor 22. Sprocket chain 31 is secured to lug 32 at the upper left hand corner of main frame 10 as viewed in Fig. 1. Chain 31 passes partly around and beneath sprocket 27, then across auxiliary frame 20 and over sprocket 28, thence downwardly where it is anchored to lug 33 at the base of main frame 10. Similarly, chain 34 is anchored at its upper end to lug 35 on the main frame passing downwardly under adjacent sprocket 28, thence upwardly and over adjacent sprocket 27, and downwardly to lug 36 at the base of main frame 10.

From this description it will be apparent that as sprocket 28 is driven by motor 22 through chain 30 and sprocket 29, auxiliary frame 20 is raised or lowered within main frame 10, being positively maintained in horizontal position at all levels.

Upper and lower endless conveyor belts are provided for delivering cans to the machine and for receiving cans from it. Upper conveyor belt 40 is mounted on rollers 41, 41 which are supported by means not shown upon the structure of the building or warehouse. Upper belt 40 serves to supply cans to the stacking machine, the belt moving from right to left as viewed in Fig. 1. Similarly, lower conveyor belt 42 rides on rollers 43 journaled in brackets 44 mounted on the floor 13. Lower conveyor belt 42 serves to remove cans from the machine and also moves from right to left as viewed in Fig. 1.

In order to transfer the incoming cans from conveyor belt 40 to the machine and deliver outgoing cans from the machine to belt 42, a sloping chute 45 is provided which is supported on roller 46 journaled to the chute near its upper end riding in channel track 47 secured to main frame 10. At its lower end chute 45 is supported upon a second roller 48 which rides in channel track 49 likewise secured to main frame 10. Chute 45 is thus movable from the position shown in Fig. 1 in which the rollers 46, 48 are at the extreme left hand end of tracks 47, 49 to a position in which the rollers are at the extreme right hand end of the tracks. Secured to the upper end of chute 45 is a plow member 50 and shunt means 51 which are the same as those shown in my co-pending application No. 169,930. Plow member 50 underlies belt 40 serving to raise the belt from between guide members 52, 52 and permit the incoming cans to be diverted by shunt 51 into the mouth of chute 45.

Figure 5:
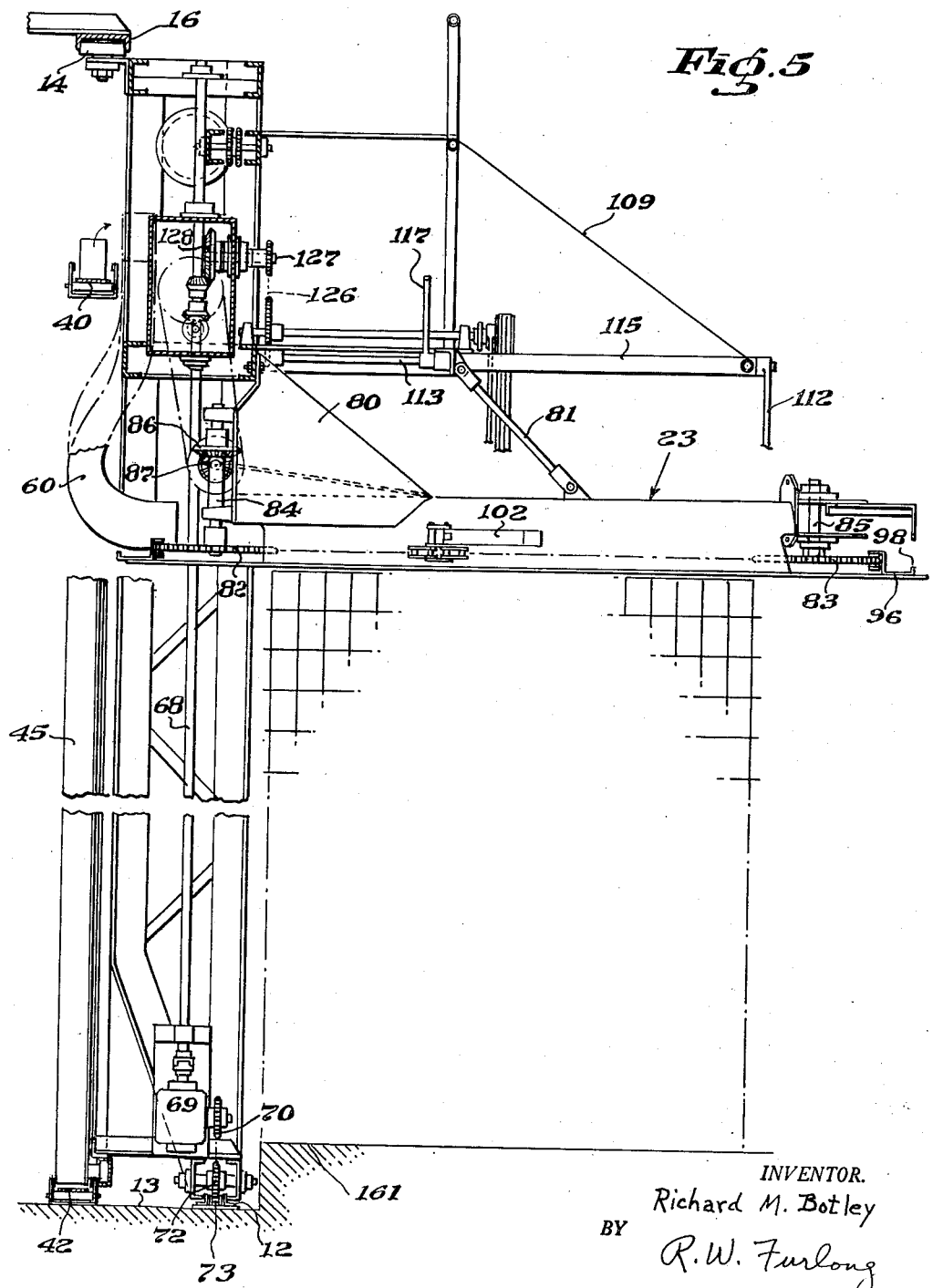
Fig. 5 is an end elevation partly broken away showing the stacker assembly in place.
Figure 6:
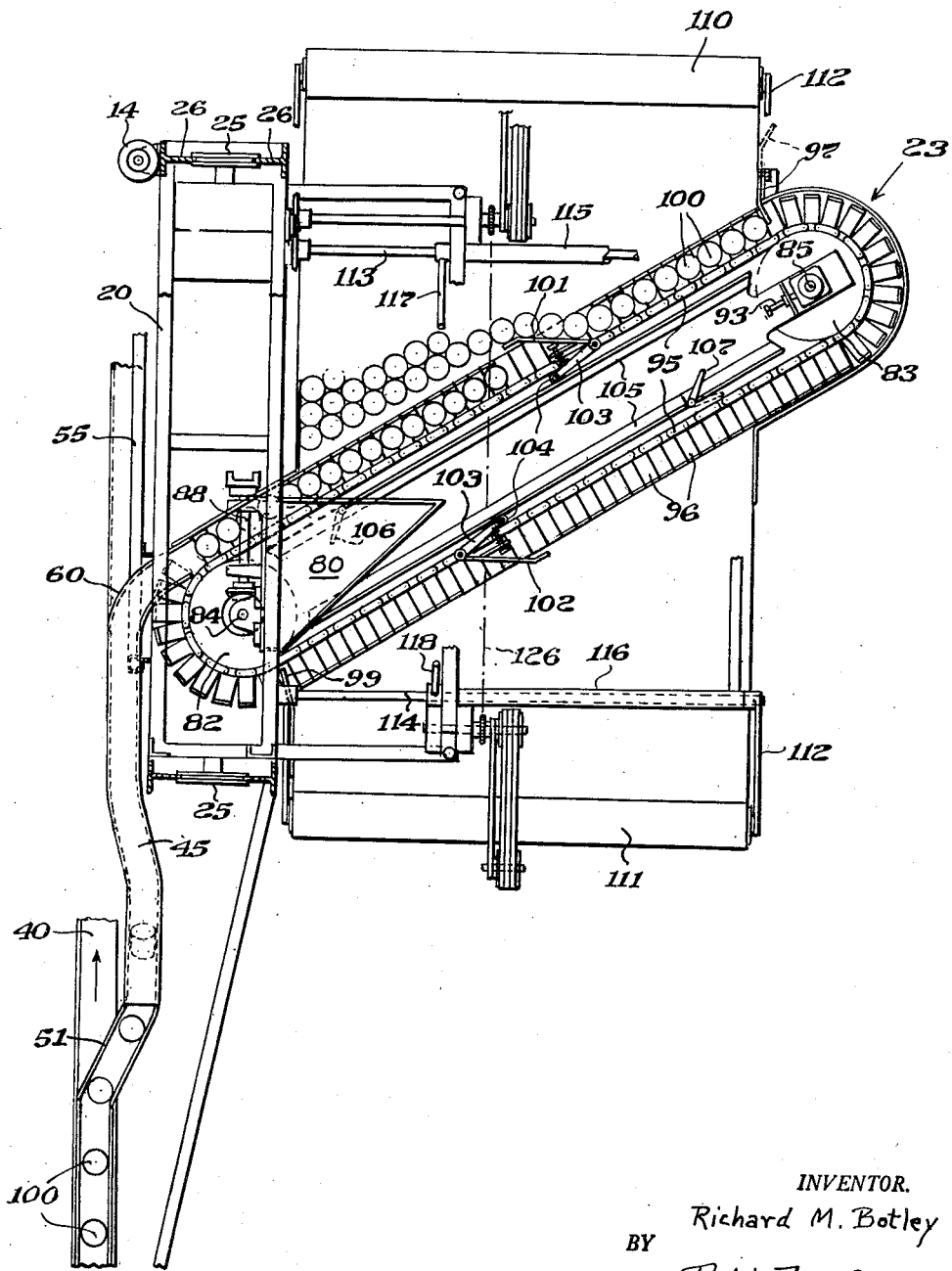
Fig. 6 is a plan view partly broken away showing the stacker assembly.

The position of chute 45 is controlled by means of auxiliary frame 20. Channel track 55 (Fig. 1a) is secured to chute 45 throughout most of its extent. Within channel track 55 ride a pair of guide rollers 56, 56 journalled on brackets 57 extending downwardly from auxiliary frame 20 and extending outwardly through vertical slot 58 in back wall 59 of main frame 10. It will be seen that as auxiliary frame 20 moves upwardly and downwardly within main frame 10, chute 45 moves laterally while maintaining its sloping position. When stacker assembly 23 is mounted in place, curved auxiliary chute 60, the outer end of which extends through slot 58 to nest within chute 45, serves to convey the cans sliding down chute 45 to stacker assembly 23 as shown in Figs. 5 and 6. Similarly, when unstacker assembly 24 is in place a second auxiliary chute 61 serves to convey outgoing cans from the unstacker assembly into chute 45 where they slide downwardly and are carried away by conveyor belt 42.

As shown best in Fig. 4, electric motor 21 which provides the main source of power for the machine is coupled through a suitable reversing and reducing gear box and clutch to jack shaft 65 carrying bevel gear 66 which meshes with a second bevel gear 67 secured on vertical shaft 68. Shaft 68 serves to drive gear reducer 69 carrying sprocket 70 mounted at the lower end of main frame 10. A pair of spaced idler sprockets 71, 72 mounted beneath sprocket 70 are journaled to main frame 10. Sprocket chain 73 is secured at its ends to opposite ends of the storage space or warehouse, a loop of the chain passing between sprockets 71, 72 and upwardly over drive sprocket 70. It will be apparent from this arrangement that operation of motor 21 causes rotation of sprocket 70 serving to advance main frame 10 along track 12.

Take-up and let-off paper rolls 110, 111 (Figs. 2, 4, 6) are journaled at the ends of supporting arms 112, 112 secured to opposite ends of shafts 113, 114 which are journaled in sleeves 115, 116 supported from auxiliary frame 20 by means of guy 109. Manually operated lever arms 117, 118 are likewise secured to shafts 113 and 114 respectively permitting take-up and let-off rolls 110 and 111 to be raised or lowered as desired. Each of rolls 110, 111 may be driven at a constant peripheral speed by means of friction belt drive 120, 121 mounted on pulleys 123, 124, pulley 123 being mounted on an overrunning clutch on shaft 125 driven by means of chain and sprocket drive 126 from jack shaft 127 which in turn is driven through bevel gears 128 from the end of drive shaft 68. Only one of rolls 110, 111 is used at any given time, the other roll being raised to inoperative position by means of its respective lever arm as illustrated in Fig. 4, in which roll 111 is shown in operative position while roll 110 is raised to inoperative position. These rolls serve to let out and take up the sheet material 119, preferably heavy paper, which is disposed between successive tiers of cans in order to stabilize the stack.

Stacker assembly 23 together with its associated auxiliary chute 60 as is best shown in Figs. 5 and 6 is mounted on auxiliary frame 20 by means of bracket 80 and tie member 81, and includes a pair of sprocket wheels 82, 83 mounted on vertical shafts 84, 85 carried at opposite ends of assembly 23. Sprocket wheel 82 is driven through its shaft 84 and bevel gears 86, 87 from auxiliary drive shaft 88 which is provided with a coupling 89 to jack shaft 90 which in turn is driven through chain and sprocket 91 from main drive shaft 92 powered by electric motor 21 (see Figs. 4 and 6). A take-up adjustment 93 is provided to adjust the spacing between sprocket wheels 82, 83.

Carried by sprocket wheels 82, 83 is sprocket chain 95 the links of which carry outwardly extending horizontal conveyor members 96. 96 which receive cans 100 from chute 60 and advance them outwardly across the stack. Conveyor members 96 have an upturned flange 98 at their ends to maintain the cans in position. Pivotally mounted near the outboard end of assembly 23 is a gate or stop 97 which in one position overlies conveyor members 96 in a position to intercept cans 100 as they are carried along on the advancing reach of the conveyor, and in its other position is clear of the cans. A second gate 99 is mounted on the opposite side of assembly 23 near the inboard end.

Spaced along chain 95 there is provided a pair of shunt members 101, 102 pivoted to a link of chain 95. Each shunt is provided with an arm 103, 103 provided at its end with cam follower 104, 104 riding on cam tracks 105, 105 secured to assembly 23. Manually adjustable switches 106, 106 are provided at the entering end of cam tracks 105, 105 to direct cam followers 104 toward or away from the operative surface of cam tracks 105. Flange 98 is omitted from the four or five conveyor members 96 immediately adjacent shunts 101, 102 to permit the cans to slide off their outer ends.

The unstacker assembly 24, as is best shown in Figs. 7 and 8, likewise is mounted (when stacker assembly 23 has been dismounted) together with its associated auxiliary chute 61 by means of a bracket 140 on auxiliary frame 20, the outer end of assembly 24 being supported by means of tie member 141. Assembly 24 includes two pairs of spaced sprocket wheels 142, 143 mounted on horizontal shafts 144, 145 respectively, carried at opposite ends of assembly 24. Shaft 144 at the inboard end is driven, as best shown in Fig. 4, through universal joint 146 and auxiliary shaft 147 which connects through the same coupling 89 as is employed for driving the stacker shaft. Mounted on sprocket wheels 142, 143 is a pair of sprocket chains 150, 151 the links of which carry guide plates 152, 152 which are maintained in a vertical plane. At equally spaced intervals along the chains is mounted a pair of shunt members 153, 154 which are pivotally mounted on chains 150, 151 and maintained in a position extending transversely outwardly from the direction of travel of the chain, as best shown in Fig. 8, by means of compression coil springs 155. Immediately in advance of shunt members 153, 154 along the reach of the chains, four or five guide members 152 are omitted in order to provide an aperture through which cans 100 may enter between the parallel guide members as shunt members 153, 154 advance. Just in advance of these apertures along the reach of the chain are provided pusher members 156, 157 which are cushioned with coil springs 158.

Since some fall is required through chute 45 in order to permit the cans removed from the stack to slide by gravity on to conveyor belt 42, it is essential that the lowermost tier 160 be arranged at a higher level than conveyor belt 42, as by providing a false bottom 161 for the stack.

Stacking operation

In order to stack cans, stacker assembly 23 is mounted on auxiliary frame 20 and coupled to the power drive, auxiliary chute 60 having its free end nested within chute 45. In order to lay the lowermost tier, auxiliary frame 20 is lowered by means of motor drive 22 to its lowermost position, chute 45 at this point being moved to a position to the right of that shown in Fig. 1 so that auxiliary chute 60 communicates with chute 45 near the lower end of the latter. As cans 100 are carried along conveyor belt 40, they are removed by means of plow member 50 and shunt 51 being fed into the upper end of chute 45. As the cans approach the bottom of chute 45, they are diverted by auxiliary chute 60 on to conveyor members 96.

The power source 21 being turned on, conveyor members 96 are continuously advanced along their path by means of sprocket chain 95, the main frame 10 being simultaneously advanced along track 12 by means of chain drive 70, 73. As main frame 10 is advancing to the right, as viewed in Fig. 1, the cans will be stacked as shown in Fig. 6, the cans being carried on conveyor members 96 until they reach stop 97 at which point the row of cans will remain stationary while conveyor members 96 continue to advance by sliding beneath the cans, the cans being kept in alignment during this operation by means of upstanding flanges 98. As chain 95 continues to advance, shunt member 101 is urged outwardly to the position shown in Fig. 6 by switch member 106 as it passes the inboard end of cam track 105. As shunt member 101 continues to advance behind the stationary row of cans, they slide outwardly off the conveyor members 96 to form the first tier of the stack. It should be noted that the first row of cans, which extends diagonally across the stack, is not precisely parallel to the row of cans as it stands on conveyor members 96 since the main frame is slowly advancing during this entire operation.

Immediately following passage of shunt member 101 a new row of cans is advanced on conveyor members 96 across the stack, this row being stopped as it reaches gate 97 and being in turn moved transversely off the conveyor by means of shunt member 102 as it advances, to form the second row of the first tier.

During this stacking operation, roll 111 is raised to inoperative position, and roll 110 is lowered so that it rests upon the top of the first tier, the end of the sheet 119 of kraft paper, fabric, or similar sheet material carried by roll 110 being anchored at the end of the stack. Belt drive 120 is not required for this operation, the paper being drawn from the roll as the main frame 10 advances; pulley 123 being mounted on an overrunning clutch, belt drive 120 merely idles on roll 110.

When the first tier is completed, sheet material 119 is severed and auxiliary frame 20 is raised by means of driving motor 22 to the desired level for stacking the second tier or layer. The direction of travel of main frame 10 is thereupon reversed so that it advances to the left as viewed in Fig. 1, and at this point let-off roll 110 is raised to inoperative position and roll 111 is lowered into operative position and the free end of the sheet material is anchored at the end of the stack. Switch 106 is adjusted so that cam followers 104 will not ride on cam track 105, but instead will fall behind it leaving shunt member 101 in inoperative position as it passes toward the outward end of assembly 23. Likewise gate 97 is raised to permit cans 100 to pass freely until they are stopped by gate 99 near the inboard end of the assembly and permit them to be pushed transversely off conveyor members 96 by shunt member 102 which is now in operative position by reason of suitable adjustment of switch 107. The stationary row of cans 100 is thus transferred on to the surface of the sheet material 119 which has been laid over the top of the lowermost tier. Upon reaching the end of the second tier the operation is again reversed, roll 110 being raised and roll 111 being lowered so as to lay the sheet material 119 on the third tier of cans, and gate 97 being lowered.

It will be noted that movement of cans into the machine is substantially continuous since a new row of cans is being conveyed across the stack while the preceding stationary row is being transferred to the stack by the shunt member.

*Unstacking operation*

When it is desired to unstack cans which have previously been stacked, stacker assembly 23 is removed and unstacker assembly 24 is mounted in its place on auxiliary frame 20 together with auxiliary chute 61. When the main frame advances to the left as viewed in Fig. 1, the cans in the topmost tier are urged row by row transversely between guide plates 152, 152 by means of shunt member 154 as it advances along the lowermost reach of chains 150, 151 across the top of the stack toward the inboard end of assembly 24. As shunt member 154 reaches the end of the first row of cans, pusher member 157 encounters the outboard end of the stationary row of cans between moving guide members 152, 152 and thereupon slides the whole row across the surface of the underlying sheet material into auxiliary chute 61 whence the cans slide down chute 45 to conveyor belt 42. Immediately following the pusher member 157 is the second shunt member 153 which slides each can in the next row in turn between the moving guide members 152, the second displaced row of cans being in turn pushed across the surface of the sheet material into auxiliary chute 61 by means of pusher member 156.

It will be apparent that the operation is substantially continuous since each shunt is immediately behind a pusher member so that as the pusher member is expelling a row of cans, the shunt is refilling the space between guide members 152 with new cans.

It will be noted that since the main frame 10 is continuously moving toward the top of the sheet, as viewed in Fig. 8, during the unstacking operation, the angle of the unstacker assembly 24 is slightly greater than the angle of the row of cans in the stack which compensates for the slow but continuous advance of main frame 10.

On the return trip as the next lower tier of cans is unstacked, the angle of the unstacker assembly is adjusted since the shunt member is now operating on the opposite side of the assembly (the lower side as viewed in Fig. 8).

In order to remove the sheet material during the unstacking operation so that the next lower tier of cans will be exposed for subsequent unstacking, roll 111 together with its driving belt 121 is lowered to operative position (and roll 110 is raised to inoperative position) while the unstacker is moved to the left, as seen in Fig. 1. The end of the layer of sheet material is started around roll 111 manually, whereupon the device automatically removes the sheet material immediately following unstacking of the overlying tier of cans, roll 111 being driven by belt drive 121.

On the return trip roll 111 is raised to inoperative position while roll 110 together with its driving belt 120 is lowered so as to take up the sheet material following removal of the next tier of cans.

As each tier or layer of cans in unstacked, of course, auxiliary frame 20 is lowered by a distance equal to the height of the tier.

Although I have herein described a specific embodiment of my device, I do not intend to limit myself solely thereto, but to include all of the obvious variations and modifications within the spirit and scope of the appended claims. For example, my device may incorporate duplicate main supporting frames, each riding on separate but parallel rails 12 and supporting opposite ends of the same stacker or unstacker assembly, as may be necessary when operating over wider stack widths than those disclosed in the drawings.

I claim:

1. A machine for assembling objects stackable in superposed tiers into a stack stabilized by sheet material interposed between adjacent tiers and for unstacking objects so stacked, said machine comprising in combination a frame member linearly movable horizontally along said stack, endless conveyor means mounted on said frame member extending across said stack for transporting said objects across said stack, shunt means movable across said stack with said conveyor means to move said objects transversely of said conveyor as said conveyor advances, and means for paying out and taking up said sheet material between said tiers.

2. A machine as defined in claim 1 wherein said conveyor means is vertically adjustably mounted on said frame member and including means for moving said conveyor vertically and for moving said frame member linearly along said stack.

3. A machine for assembling objects stackable in superposed tiers into a stack stabilized by sheet material interposed between adjacent tiers and for unstacking objects so stacked, said machine comprising in combination a frame member linearly movable horizontally along said stack, endless conveyor means mounted on said frame member extending across said stack for transporting said objects across said stack, and shunt means movable with said conveyor means across said stack to move said objects transversely of said conveyor means as said conveyor advances.

4. A machine for stacking objects stackable in superposed tiers into a stack stabilized by sheet material interposed between adjacent tiers, said machine comprising in combination a frame member linearly movable horizontally along said stack, endless conveyor means mounted on said frame member extending across said stack for transporting said objects across said stack, means for stopping the movement of said objects at an edge of said stack to form a stationary row extending across the stack while said conveyor continues to advance, shunt means movable with said conveyor means for moving said stationary row transversely off said conveyor means onto said stack as said conveyor advances, and means for paying out sheet material between said tiers as said objects are stacked.

5. A machine for stacking objects stackable in superposed tiers into a stack stabilized by sheet material interposed between adjacent tiers, said machine comprising in combination a frame member linearly movable horizontally along said stack, means for moving said frame member along said stack, endless conveyor means mounted on said frame member extending across said stack for transporting said objects across said stack, means for stopping the movement of said objects at an edge of said stack to form a stationary row extending across the stack while said conveyor continues to advance, and shunt means movable with said conveyor means for moving said stationary row transversely off said conveyor means onto said stack as said conveyor advances.

6. A machine for stacking objects stackable in superposed tiers into a stack stabilized by sheet material interposed between adjacent tiers, said machine comprising in combination a frame member linearly movable horizontally along said stack, means for moving said frame member along said stack, endless conveyor means vertically adjustable mounted on said frame member and extending across said stack for transporting said objects across said stack, means for stopping the movement of said objects at an edge of said stack to form a stationary row extending across the stack while said conveyor continues to advance, shunt means movable with said conveyor means for moving said stationary row transversely off said conveyor means onto said stack as said conveyor advances, means for raising said conveyor vertically of said frame member to stack another tier on top of the first said tier, and means for paying out sheet material between said tiers as said objects are stacked.

7. In a machine for stacking objects stackable in superposed tiers into a stack stabilized by sheet material interposed between adjacent tiers, endless conveyor means extending across said stack for transporting said objects across said stack, means for stopping the movement of said objects at an edge of said stack to form a stationary row extending across the stack while said conveyor continues to advance, shunt means movable with said conveyor means for moving said stationary row transversely off said conveyor means onto said stack as said conveyor advances.

8. A machine for stacking objects stackable in superposed tiers into a stack stabilized by sheet material interposed between adjacent tiers, said machine comprising in combination a frame member linearly movable horizontally along said stack, means for moving said frame member along said stack, endless conveyor means vertically adjustably mounted on said frame member and extending across said stack for transporting said objects across said stack, means for supplying objects to be stacked to said conveyor means, means for stopping the movement of said objects at an edge of said stack to form a stationary row extending across the stack while said conveyor continues to advance, shunt means extending transversely across said conveyor means and movable therewith for sequentially moving said stationary row of objects transversely off said conveyor means onto said stack as said conveyor advances, means for raising said conveyor vertically of said frame member to stack another tier on top of the first said tier, and means for paying out sheet material between said tiers as said objects are stacked.

9. A machine for stacking objects stackable in superposed tiers into a stack stabilized by sheet material interposed between adjacent tiers, said machine comprising in combination a frame member linearly movable horizontally along said stack, means for moving said frame member along said stack, endless conveyor means mounted on said frame member extending across said stack for transporting said objects across said stack, means for supplying objects to be stacked to said conveyor means, gate means for stopping the movement of said objects at an edge of said stack to form a stationary row held in sliding contact with said conveyor as it continues to advance therebeneath, shunt means extending transversely across said conveyor means and movable therewith for sequentially moving said stationary row of objects transversely off said conveyor means onto said stack as said conveyor advances, and means for paying out sheet material between said tiers as said objects are stacked.

10. A machine as defined in claim 9 wherein a plurality of shunt means are disposed at spaced intervals along said conveyor means, said intervals being approximately equal to the width of the stack.

11. A machine as defined in claim 9 wherein said shunt means is pivotally mounted on said conveyor means for swinging movement to and from an operative position and is provided with a cam follower, and a cam track on which said cam follower rides to maintain said shunt means in operative position.

12. A machine as defined in claim 11 wherein a first cam track is provided for maintaining said shunt means in operative position on the outgoing reach of said conveyor means and a second cam track is provided for maintaining said shunt means in operative position on the return reach, and a first gate means is provided at the far edge of said stack on the outgoing reach of the conveyor and a second gate means is provided at the near edge of the stack on the return reach.

13. A machine for unstacking objects stacked in superposed tiers stabilized by sheet material interposed between adjacent tiers, said machine comprising in combination a frame member linearly movable along said stack, endless conveyor means mounted on said frame member and extending across said stack for transporting said objects across said stack, shunt means movable with said conveyor means for moving said objects transversely to said conveyor means from said stack, and means for taking up said sheet material as said objects are unstacked.

14. A machine for unstacking objects stacked in superposed tiers stabilized by sheet material interposed between adjacent tiers, said machine comprising in combination a frame member linearly movable along said stack, endless conveyor means mounted on said frame member and extending across said stack for transporting said objects across said stack, said conveyor means including a plurality of opposed generally parallel guide members forming an open-bottom passageway to guide a row of said objects across said stack, shunt means projecting transversely from said guide members to move said objects transversely to a position between said opposing guide members, a pusher member for pushing across the stack objects located between said guide members while resting on said sheet material, and means for advancing said guide members, shunt member and pusher member together across said stack.

15. In a machine for unstacking objects stacked in superposed tiers stabilized by sheet material interposed between adjacent tiers, endless conveyor means extending across said stack for transporting said objects across said stack, said conveyor means including a plurality of opposed generally parallel guide members forming an open-bottom passageway to guide a row of said objects across said stack, shunt means projecting transversely from said guide members to move said objects transversely to a position between said opposing guide members, a pusher member for pushing across the stack objects located between said guide members while resting on said sheet material, and means for advancing said guide members, shunt member and pusher member together across said stack.

16. A machine for unstacking objects stacked in superposed tiers stabilized by sheet material interposed between adjacent tiers, said machine comprising in combination a frame member linearly movable along said stack, means for moving said frame member along said stack, endless conveyor means vertically adjustably mounted on said frame member and extending across said stack for transporting said objects across said stack, said conveyor means including a plurality of opposed generally parallel guide members forming an open-bottom passageway to guide a row of said objects across said stack, shunt means projecting transversely from said guide members to move said objects transversely to a position between said opposing guide members, a pusher member for pushing across the stack objects located between said guide members while resting on said sheet material, and means for advancing said guide members, shunt member and pusher member together across said stack, means for lowering said conveyor vertically of said frame member to unstack another tier after removal of the first said tier, and means for taking up said sheet material as said objects are unstacked.

17. A machine for unstacking objects stacked in superposed tiers stabilized by sheet material interposed between adjacent tiers, said machine comprising in combination a frame member linearly movable along said stack, means for moving said frame member along said stack, endless conveyor means vertically adjustably mounted on said frame member and extending across said stack for transporting said objects across said stack, said conveyor means including a plurality of opposed generally parallel guide members forming an open-bottom passageway to guide a row of said objects across said stack, shunt means projecting transversely from said guide members to move said objects transversely to a position between said opposing guide members, a pusher member for pushing across the stack objects located between said guide members while resting on said sheet material, and means for advancing said guide members, shunt member and pusher member together across said stack, means for lowering said conveyor vertically of said frame member to unstack another tier after removal of the first said tier, means for receiving said objects from said conveyor and means for taking up said sheet material as said objects are unstacked.

18. A machine as defined in claim 14 wherein a plurality of shunt members and pusher members are disposed at spaced intervals along said conveyor means, said intervals being approximately equal to the width of said stack.

19. A machine as defined in claim 14 wherein a pair of shunt members is mounted side by side on said conveyor means extending transversely outwardly from each side of said conveyor means, and said pusher member is mounted immediately ahead of said pair of shunt members.

20. A machine as defined in claim 19 wherein a plurality of pusher members and pairs of shunt members is mounted at spaced intervals along said conveyor means, said intervals being approximately equal to the width of the stack.

References Cited in the file of this patent

UNITED STATES PATENTS

| | | |
|---|---|---|
| 1,411,172 | Kaye | Mar. 28, 1922 |
| 1,786,622 | Layer | Dec. 30, 1930 |